(12) United States Patent
Wang et al.

(10) Patent No.: US 12,288,168 B2
(45) Date of Patent: Apr. 29, 2025

(54) BLOCKCHAIN-BASED ROOM INVENTORY MANAGEMENT SYSTEM AND METHOD

(71) Applicants: OBOOK HOLDINGS INC., George Town (KY); OBOOK INC., New Taipei (TW)

(72) Inventors: Chun Kai Wang, Taipei (TW); Chung Han Hsieh, Taipei (TW); Chih Yang Liu, Taipei (TW)

(73) Assignees: OBOOK HOLDINGS INC., Grand Cayman (KY); OBOOK INC., Taipei (TW)

( * ) Notice: Subject to any disclaimer, the term of this patent is extended or adjusted under 35 U.S.C. 154(b) by 431 days.

(21) Appl. No.: 17/711,049

(22) Filed: Apr. 1, 2022

(65) Prior Publication Data
US 2022/0222590 A1 Jul. 14, 2022

Related U.S. Application Data

(63) Continuation-in-part of application No. 16/197,150, filed on Nov. 20, 2018, now abandoned.

(60) Provisional application No. 62/588,909, filed on Nov. 20, 2017.

(51) Int. Cl.
G06Q 10/02 (2012.01)
G06Q 30/0201 (2023.01)
H04L 9/00 (2022.01)

(52) U.S. Cl.
CPC ......... *G06Q 10/02* (2013.01); *G06Q 30/0206* (2013.01); *H04L 9/50* (2022.05)

(58) Field of Classification Search
CPC ...... G06Q 10/02; G06Q 30/0206; H04L 9/50; H04L 9/3297
See application file for complete search history.

(56) References Cited

U.S. PATENT DOCUMENTS

| | | | |
|---|---|---|---|
| 10,824,988 B2 * | 11/2020 | Mohammad | G06Q 10/087 |
| 2018/0189449 A1 * | 7/2018 | Karumba | G16H 40/20 |
| 2018/0264347 A1 * | 9/2018 | Tran | G06V 40/28 |
| 2018/0330343 A1 * | 11/2018 | Gray | G06Q 20/3829 |
| 2019/0156440 A1 * | 5/2019 | Wang | H04L 9/3297 |
| 2019/0377724 A1 * | 12/2019 | Pennington | G06Q 20/02 |
| 2020/0074389 A1 * | 3/2020 | Mohammad | G06Q 30/0601 |
| 2020/0294128 A1 * | 9/2020 | Cella | H04L 9/3239 |

(Continued)

*Primary Examiner* — Peter Ludwig
(74) *Attorney, Agent, or Firm* — Winston Hsu

(57) ABSTRACT

A blockchain-based room inventory management system includes a property management system (PMS) module and an intermediate server system. The PMS module may be under a hotel's direct control. The intermediate server system communicates with at least one online travel agency (OTA) module and/or at least one booking engine using Ethereum-based smart contracts for confirming and processing a room reservation event. If the room reservation event is confirmed to be a successful transaction, the intermediate server system also updates the successful transaction into the PMS module and a blockchain formed by multiple node servers. The blockchain contains multiple blocks arranged in a chronological order for distinguishing successful transactions of different moments. In this way, each successful transaction is prevented from wrongly preceded by a later successful transaction. And the room inventory management system neutralizes an overbooking issue accordingly.

19 Claims, 9 Drawing Sheets

(56) References Cited

U.S. PATENT DOCUMENTS

| | | | |
|---|---|---|---|
| 2022/0188819 A1* | 6/2022 | Ognjanovic | H04L 9/3236 |
| 2022/0263671 A1* | 8/2022 | Liu | H04L 9/50 |
| 2022/0358031 A1* | 11/2022 | Yanamala | G06F 11/3688 |
| 2023/0124459 A1* | 4/2023 | Choi | G06Q 30/0222 |
| | | | 705/14.23 |

* cited by examiner

US 12,288,168 B2

BLOCKCHAIN-BASED ROOM INVENTORY MANAGEMENT SYSTEM AND METHOD

CROSS REFERENCE TO RELATED APPLICATIONS

This application is a continuation-in-part of U.S. application Ser. No. 16/197,150, filed on Nov. 20, 2018, which claims the benefit of U.S. Provisional Application No. 62/588,909, filed on Nov. 20, 2017. The contents of these applications are incorporated herein by reference.

BACKGROUND OF THE INVENTION

1. Field of the Invention

The present invention relates to a room inventory management system and a method for managing the system, and more particularly, to a blockchain-based room inventory management system.

2. Description of the Prior Art

Room reservation is a critical service of hotels or travel agencies. In conventional room reservation services, a booking engine or an online travel agency (OTA) represents a hotel and provides a remote user interface to a client for booking an available room of the hotel at a scheduled time.

An OTA indicates a travel website that specializes in the sale of travel products, e.g. hotel room reservations, to clients. The OTA has an online agency agreement with room suppliers (e.g. hotels) to resell their room reservations. Under such condition, the OTA takes payment from the client who reserves at least one available room and pays net rates to the hotels.

A booking engine for hotels' room reservation indicates a website that allows a client to book available room reservations. The booking engine may also introduce customized prices and/or payment rules to a client for an easier decision in room reservation.

However, if more than one client log on the remote user interface for booking a same available room of a hotel in a short period of time, overbooking may easily occur. Overbooking results in significant loss for both sides of the clients and the hotel. For example, overbooking bothers the hotel to arrange additional rooms, services and/or compensations. Also, overbooking forces the client to change his/her travel plan in a limited time and sabotages the client's travel experience. Such inconvenience becomes more frequent and serious in a peak season of traveling. However, the hotel is limited by current OTAs and/or booking engines in processing overbooking in aspect of technology. Therefore, the hotel needs to efficiently neutralize overbooking via technological solutions.

SUMMARY OF THE INVENTION

This document discloses a method for managing a blockchain-based room inventory management system. The method includes: maintaining, in each node of a plurality of nodes in a hotel room inventory system, a blockchain that stores all successful transactions regarding a given hotel room item, wherein the blockchain includes a number of blocks that are singly linked in a chronological order, each block cryptographically referencing its directly-preceding block such that data in any block cannot be changed without changing all subsequent blocks, each block storing a successful transaction regarding the given hotel room item; upon receiving a room reservation event from a computer network communicatively coupled to the hotel room inventory system, determining, by a master node in the plurality of nodes, whether the room reservation event can be successful by submitting a new transaction representing the room reservation event to a smart contract that is stored in the blockchain, wherein the smart contract includes programmed criteria configured to determine, based on a current quantity balance on the given hotel room item, whether the submitted transaction represents a conflict on all existing successful transactions currently stored in the blockchain regarding the given hotel room item; upon determining, based on the smart contract, that the new transaction representing the room reservation event can be successful, creating, by the master node, a new block to be attached to the blockchain, wherein the new block stores data representing the new transaction as successful, wherein said creation of the new block causes the new block to be added to the blockchain in each node of the plurality of nodes in the hotel room inventory system; and adjusting automatically, by the smart contract and based on a predetermined fluctuation rule, a market price for the given hotel room item when the room reservation event has caused the current quantity balance satisfying the predetermined fluctuation rule.

This document further discloses a blockchain-based hotel room inventory system. The system includes a plurality of nodes, wherein each node of a plurality of nodes is configured to maintain a blockchain that stores all successful transactions regarding a given hotel room item, wherein the blockchain includes a number of blocks that are singly linked in a chronological order, each block cryptographically referencing its directly-preceding block such that data in any block cannot be changed without changing all subsequent blocks, each block storing a successful transaction regarding the given hotel room item; a smart contract that is stored in the blockchain, wherein the smart contract includes programmed criteria configured to determine, based on a current quantity balance on the given hotel room item, whether the submitted transaction represents a conflict on all existing successful transactions currently stored in the blockchain regarding the given hotel room item; and a master node that is configured to: receive a room reservation event from a computer network communicatively coupled to the hotel room inventory system; determine whether the room reservation event can be successful by submitting a new transaction representing the room reservation event to the smart contract; and upon determining, based on the smart contract, that the new transaction representing the room reservation event can be successful, create a new block to be attached to the blockchain, wherein the new block stores data representing the new transaction as successful, and wherein said creation of the new block causes the new block to be added to the blockchain in each node of the plurality of nodes in the hotel room inventory system; and wherein the smart contract adjusts automatically a market price for the given hotel room item based on a predetermined fluctuation rule when the room reservation event has caused the current quantity balance satisfying the predetermined fluctuation rule, which contains the current quantity balance or a period of reservation time.

This document further discloses a non-transitory computer readable medium including a plurality of instructions that, when executed by one or more processors of a computerized hotel room inventory system, cause the system to: maintain, in each node of a plurality of nodes in the hotel room inventory system, a blockchain that stores all successful transactions regarding a given hotel room item, wherein the blockchain includes a number of blocks that are singly linked in a chronological order, each block cryptographically referencing its directly-preceding block such that data in any block cannot be changed without changing all subsequent blocks, each block storing a successful transaction regarding the given hotel room item;

upon receiving a room reservation event from a computer network communicatively coupled to the hotel room inventory system, determine, by a master node in the plurality of nodes, whether the room reservation event can be successful by submitting a new transaction representing the room reservation event to a smart contract that is stored in the blockchain, wherein the smart contract includes programmed criteria configured to determine, based on a current quantity balance on the given hotel room item, whether the submitted transaction represents a conflict on all existing successful transactions currently stored in the blockchain regarding the given hotel room item; and upon determining, based on the smart contract, that the new transaction representing the room reservation event can be successful, create, by the master node, a new block to be attached to the blockchain, wherein the new block stores data representing the new transaction as successful, and wherein said creation of the new block causes the new block to be added to the blockchain in each node of the plurality of nodes in the hotel room inventory system; and wherein the smart contract adjusts automatically a market price for the given hotel room item based on a predetermined fluctuation rule when the room reservation event has caused the current quantity balance satisfying the predetermined fluctuation rule, which contains the current quantity balance or a period of reservation time.

These and other objectives of the present invention will no doubt become obvious to those of ordinary skill in the art after reading the following detailed description of the preferred embodiment that is illustrated in the various figures and drawings.

DETAILED DESCRIPTION

Reference will now be made in detail to the examples of the invention, which are illustrated in the accompanying drawings. Wherever possible, the same reference numbers will be used throughout the drawings to refer to the same or like parts.

Structure of a Conventional Room Inventory Management System

Figure 1:
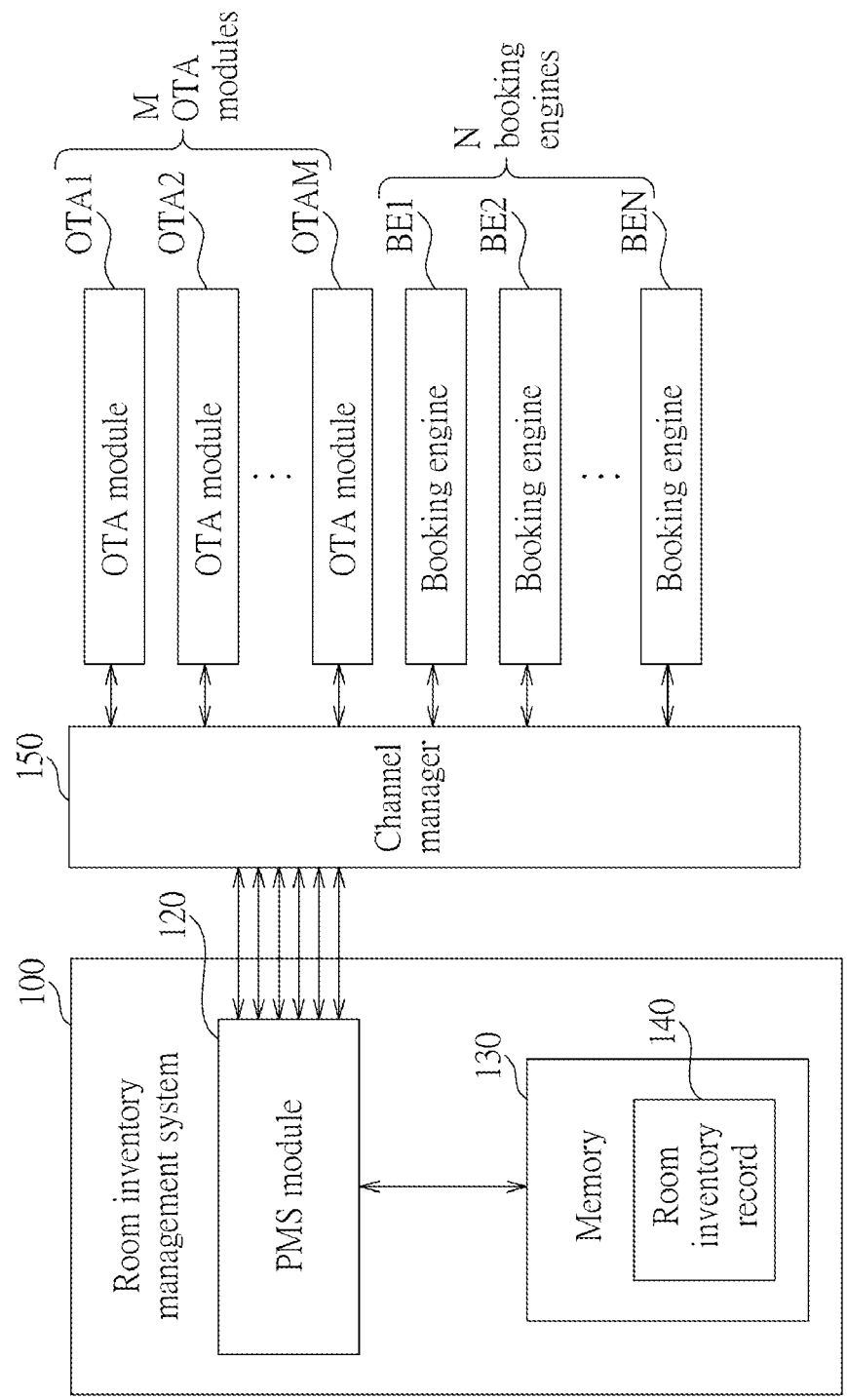
FIG. 1 illustrates how a conventional room inventory management system works with OTA modules and/or booking engines for a client to book a room reservation.

FIG. 1 illustrates how a conventional room inventory management system 100 works with OTA modules and/or booking engines for a client to book a room reservation, via an intermediate channel manager 150 connected in between and under a hotel's control. Exemplarily, the room inventory management system 100 co-works with an amount M of OTA modules OTA1, OTA2, OTAM and/or an amount N of booking engines BE1, BE2, . . . , BEN, where M and N are positive integers. Please note that at least one of the above-mentioned OTA modules and/or booking engines may also be replaced by at least one global distribution system (GDS) and/or at least one metasearch engine. However, hotels' costs of using such GDSs and metasearch engines are extremely higher than those of renting services from OTA modules and/or booking engines. Such costs may include at least constructing and maintaining a customized application programming interface (API) and service fees charged by a number of clients' request. Therefore, ordinary hotels prefer seeking OTA modules' and booking engines' services than seeking GDSs and metasearch engines' services. The following descriptions also focus on utilizing OTA modules and/or booking engines but still apply for conditions that utilize GDSs and metasearch engines' services.

The room inventory management system 100 is disposed in a domain that is under a hotel's control. The OTA modules OTA1, OTA2, . . . , OTAM and/or the booking engines BE1, BE2, . . . , BEN are disposed in a remote place from the hotel and not under the hotel's control. The channel manager 150 respectively maintains a communication channel with each one of the OTA modules OTA1, OTA2, OTAM and the booking engines BE1, BE2, . . . , BEN for translating and relaying their requests to the room inventory management system 100, i.e., a hotel. However, under common circumstances, each of the OTA modules OTA1, OTA2, . . . , OTAM and/or the booking engines BE1, BE2, . . . , BEN utilizes different APIs and communication protocols to deliver different types of variables and parameters. Therefore, it always increases the hotel or the channel manager 150's costs in designing customized APIs for the channel manager 150's communication channels for fitting the OTA modules OTA1, OTA2, . . . , OTAM and/or the booking engine BE1, BE2, . . . , BENs' APIs and communication protocols.

The room inventory management system 100 includes a conventional property management system (PMS) module 120 and a memory 130.

A conventional PMS module for hotels' room reservation indicates a computerized system that facilitates a hotel's room reservation. The conventional PMS module is a comprehensive software application used to cover objectives like coordinating the operating functions of a hotel's front office, sales, planning, reporting, and etc. The conventional PMS module automates hotel operations like guest bookings, guest details, online reservations, posting of charges, point of sale, telephone, accounts receivable, sales and marketing, events, food and beverage costing, materials management, HR and payroll, maintenance management, quality management and other amenities. A hotel's PMS module may have integrated or interfaced with third-party solutions like central reservation systems and revenue or yield management systems, online booking engine, back office, point of sale, door-locking, housekeeping optimization, energy management, payment card authorization and channel management systems. With the aid of cloud computing technologies, a hotel's PMS module expands its functionality to guest-facing features, such as online check-in, room service, in-room controls, guest-staff communication, virtual concierge, and etc. The expanded functionalities are mainly used by guests on their own mobile phones or such provided by the hotel in lobbies and/or rooms. A conventional PMS module always needs to give accurate and timely information on the basic key performance indicators of a hotel business such as average daily rate or occupancy rate. The conventional PMS module also helps the food and beverage management control the stocks in the store room and decide what to buy, how much and how often. In this way, the conventional PMS module 120 enables a client to complete his/her room reservation with the hotel locally via the PMS module 120 or remotely via the abovementioned OTA modules and/or booking engines.

The memory 130 keeps a room inventory record 140 that stores availability of all rooms managed by the room inventory management system 100, i.e., managed by the hotel. According to the managed rooms' availability, the managed rooms may be classified into available rooms, reserved rooms and occupied rooms managed by the room inventory management system 100. When a client reserves an available room, the available room becomes a reserved room. When the client checks-in the hotel for the reserved room, the reserved room becomes an occupied room. When the client checks-out from the hotel, the occupied room becomes an available room.

Similarly, each of the OTA modules OTA1, OTA2, . . . , OTAM has a respective room inventory. And each of the booking engines BE1, BE2, . . . , BEN has a respective room inventory record.

However, the OTA modules OTA1, OTA2, . . . , OTAM and booking engines BE1, BE2, . . . , BEN are not motivated to dynamically synchronize contents of respective room inventory records with contents of the room inventory record 140. It is because such dynamic synchronization may significantly increase their burden of waiting for the conventional PMS module 120's response. Besides, since the channel manager 150 is merely responsible for translating and relaying requests, the channel manager 150 cannot relieve the conventional PMS module 120 of such burden. More seriously, if more and more the OTA modules and booking engines keep polling the contents of the room inventory record 140, the conventional PMS module 120 will not be affordable to such polling and lead to its system crash. For avoiding such system crash, the conventional PMS module 120 may only allow limited polling for each of the OTA modules and booking engines by giving larger intervals of waiting time, from at least several minutes to several hours depending on how many OTA modules and/or booking engines that the hotel seeks service to. For example, an OTA or a booking engine may be limited to poll the room inventory record 140 by every half to two hours if there are over five OTA modules and/or booking engines that the hotel seeks service to. Such waiting time may be longer when the hotel cooperates with more OTAs and/or booking engines or during a peak season of traveling. As a result, inconsistency may inevitably occur between contents of the room inventory record 140 and the room inventory record of the OTA modules and/or booking engines because the OTA modules and/or booking engines may not have correct room inventory record while dealing with a client's room reservation request. Even under some extreme circumstances, for decreasing undesirable burden for both sides and focusing on dealing with incoming room reservation requests, the OTAs and/or the booking engines may intend to skip polling the conventional PMS module 120 at times or even frequently for saving its cost of room inventory confirmation. Worse of it, if the hotel actually runs out of available rooms and the OTA modules and/or booking engines fail to timely poll the conventional PMS module 120 for being aware, overbooking becomes inevitable.

How Overbooking Occurs in a Conventional Room Inventory Management System

How overbooking occurs in aspect of conventional technology will be further introduced in detail via references to FIG. 1.

Assume that a first client accesses the PMS system 120 via the OTA module OTA1 to reserve an available room R1 managed by the room inventory management system 100. First, the OTA module OTA1 checks its own room inventory record, which may not be consistent with the room inventory record 140, for confirming if the hotel has available rooms. If so, the OTA module OTA1 forwards the first client's room reservation request to the conventional PMS module 120. The conventional PMS module 120 then checks the room inventory record 140 to confirm if it does have available room for the first client. If so, the conventional PMS module 120 translates the first client's room reservation request to be a successful transaction and updates the room inventory record 140 to record the successful transaction. Such update includes changing availability of the room R1 to be "reserved" and decreases an available room amount of the hotel.

However, if a second client accesses the conventional PMS module 120 via the booking engine BE1 for reserving the same room R1 slightly after the first client's room reservation, such that the booking engine BE1 cannot be timely informed of the first client's successful transaction, the booking engine BE1 may mistakenly confirm that the room R1 is still available. The booking engine BE1 then forwards the second client's room reservation request to the conventional PMS module 120. Apparently, the conventional PMS module 120 will soon determine that the second client's room reservation is unsuccessful after referencing the room inventory record 140 but have to wait the booking engine BE1's next polling to inform the second client's unsuccessful room reservation. If unfortunately, the second client checks-in the hotel before the booking engine BE1's next polling, he or she and the hotel will confront an overbooking issue.

If the second client is lucky enough, the hotel may still arrange an alternative available room for him/her with some satisfiable compensation. However, if the hotel runs out of its available rooms after confirming the first client's successful transaction, the second client will still face the overbooking problem and be forced to immediately search for another available room at another hotel. Under great uncertainty, the second client's travel experience is highly likely sabotaged, and it always backfires both the hotel and the book engine BE1's credit. Worse of it, as mentioned above, if the hotel cooperates with more OTAs and/or booking engines, or if it is under a peak traveling season, severity of the overbooking problem will keep on multiplying itself.

In aspect of technology, the conventional room inventory management system 100 has the following defects:
  (1) The OTA modules and the booking engines cannot dynamically poll the conventional PMS module 120 for confirming correctness of respective room inventory records.
  (2) If the OTA modules and the booking engines increase respective frequency of polling on the conventional PMS module 120, the conventional PMS module 120 will not be affordable to its own loading of computation and/or communication bandwidth. Therefore, computational or communicative error may occur more easily.
  (3) Data inconsistence between the conventional room inventory management system 100 and the OTA modules and/or booking engines result in overbooking of the hotel. Such overbooking is getting worse when the hotel cooperates with more OTA modules and/or booking engines or during a peak traveling season.
  (4) The hotel has to cost more in developing customized APIs and communication protocols in receiving required variables and parameters from the OTA modules and/or booking engines to handle room reservation requests, or even room cancellation requests or room checkout requests.

Room Inventory Management System of the Present Invention

Figure 2:
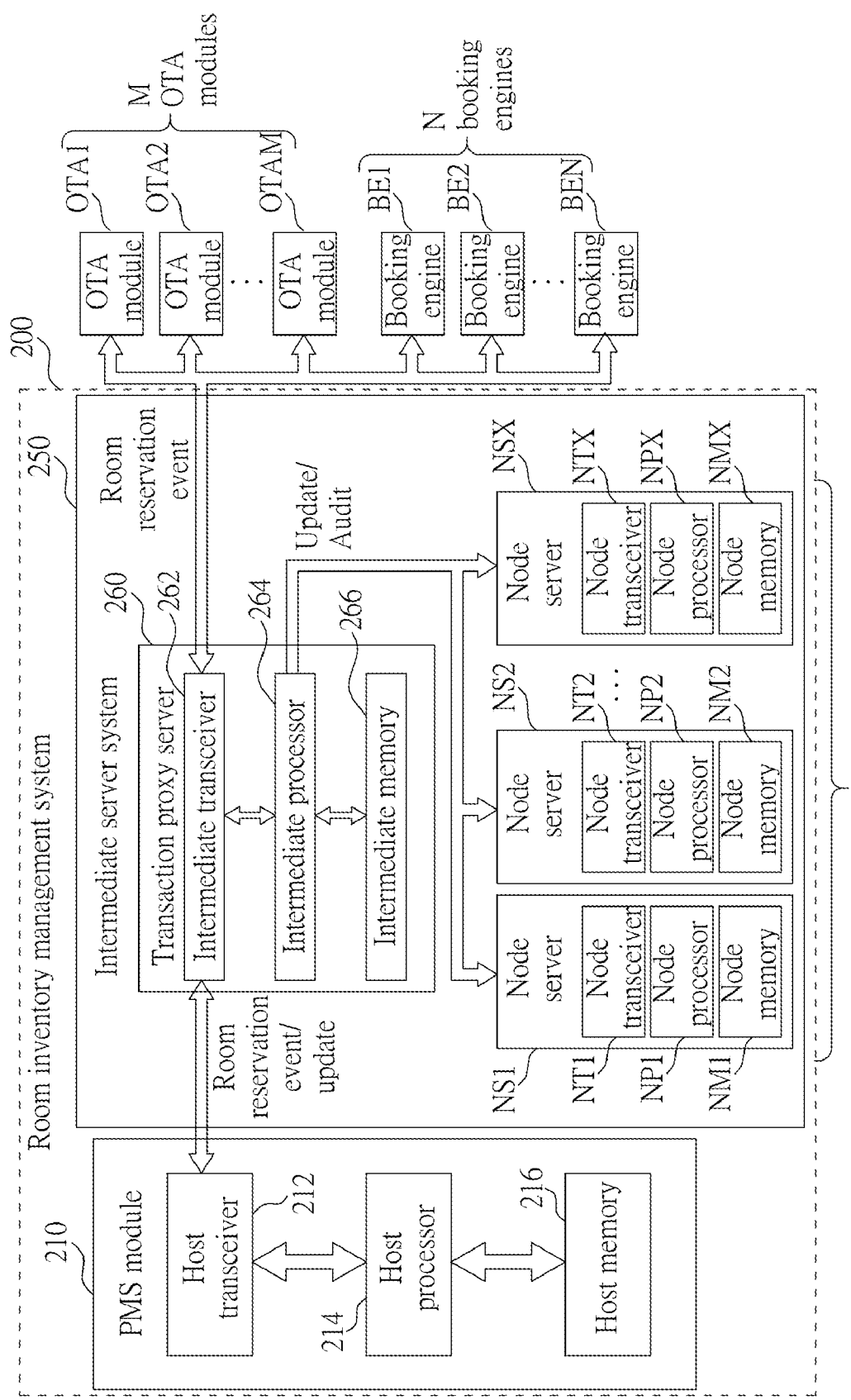
FIG. 2 illustrates a blockchain-based room inventory management system according to one embodiment of the present invention.

For effectively neutralizing the overbooking problem occurred in the conventional room inventory management system 100, the present invention discloses a blockchain-based room inventory management system according to one embodiment, i.e., a blockchain-based room inventory management system 200 illustrated in FIG. 2. The room inventory management system 200 introduces an intermediate server system capable of neutralizing the data inconsistence between the conventional PMS module and the OTA modules and/or booking engines and capable of relieving the burden of the conventional PMS system. Also, the room inventory management system 200 provides a cost-effective solution to hotels in saving communication and maintenance costs from the OTA modules, booking engines, and even from the abovementioned GDSs and metasearch engines.

A blockchain contains multiple physical nodes, each of which theoretically keeps same contents, e.g., a plurality of blocks. Each the node contains multiple blocks. In response to occurrence of a specific event, e.g. a successful transaction, a new block is generated for recording the specific event. With more and more blocks generated, a history of successful transactions can be established and even traced in the blockchain. So, the first advantage of applying the blockchain is traceability. On top of that, if an act of tampering a specific block at a specific physical node succeeds, since all the physical nodes contain theoretically-same contents, i.e., same blocks, such act can be easily detected and fixed by referencing to the other unaffected physical nodes. That is, the second advantage of applying a blockchain is its capability of defending tampering acts.

While applying the Blockchain technologies, the blockchain-based room inventory management system 200 is capable of effectively securing correctness of each successful transaction, i.e., a room reservation event. Therefore, the blockchain-based room inventory management system 200 can effectively neutralize the overbooking issue caused by applying a conventional room inventory management system.

Also, the blockchain-based room inventory management system 200 utilizes Ethereum-based smart contracts to generate a common application programming interface (API) and/or a common communication protocol for communications with the OTA modules and/or the booking engines. In some examples, the common API is for those OTA modules and/or the booking engines which are also Ethereum-based, and the common communication protocol is for those OTA modules and/or the booking engines which are not Ethereum-based. In this way, costs of the API and/or communication protocols for system maintenance and communications that include transmitting room reservation events or updating room inventory records with the OTA modules and/or the booking engines can also be significantly decreased. It is because of Ethereum-based smart contracts' open and easy properties in language designs, including relaying fewer or more understandable variables and parameters. Such cost reduction also works while the blockchain-based room inventory management system 200 works with GDSs and metasearch engines for the same reasons.

Smart contract is a technology developed under Ethereum, which is an important auxiliary technology for the blockchain technologies that are applied in the present invention. Ethereum is an open-source and blockchain-based distributed computing system and operating system featuring smart contract functionality. Ethereum provides a decentralized Turing-complete virtual machine, the Ethereum virtual machine (EVM), which can execute scripts using an international network of nodes.

Ethereum's smart contracts are based on different computer languages, which developers use to program their own functionalities. Smart contracts are high-level programming abstractions that are compiled down to Ethereum Virtual Machine (EVM) bytecode and deployed to the Ethereum blockchain for execution. Smart contracts can open up the possibility to prove functionality, e.g. self-contained provably fair casinos. Ethereum blockchain applications are often referred to as decentralized applications, since they are based on the decentralized EVM, and its smart contracts. Examples of Ethereum blockchain applications include: digital signature algorithms, securitized tokens, digital right management, crowdfunding, prediction markets, remittance, online gambling, social media platforms, financial exchanges and identity systems. Because of the Turing-complete property of Ethereum, smart contracts provide high flexibilities in function designs and implementations. Moreover, since Ethereum-based smart contracts are open sources and are easy to implement, the blockchain-based room inventory management system 200 takes the above-mentioned advantages in communications with the OTA modules and/or the booking engines with the aid of the Ethereum-based smart contracts.

The blockchain-based room inventory managing system 200 includes a novel PMS module 210 and an intermediate server system 250. The PMS module 210 may be disposed within a hotel such that the hotel can control the PMS module 210 directly. The intermediate server 250 may be disposed remotely from the PMS module 210. In one example, the intermediate server system 250 pre-processes or processes room reservation events for the PMS module 210, such that the intermediate server system 250 significantly relieves the PMS module 210's loading. In one example, the room reservation events include at least internal room reservation requests and internal room cancellation/checkout requests from the hotel, and external room reservation requests and room cancellation requests from the OTA modules and/or booking engines. The external room reservation/cancellation requests may be transmitted from external OTA modules and/or booking engines to reserve or cancel at least one room of the hotel with the aid of the API or the communication protocol developed using the Ethereum-based smart contracts. The internal room reservation/checkout requests occur when a client directly reserves a room in the hotel or when a checked-in client of the hotel decides to checkout. Also, the intermediate server system 250 utilizes the Ethereum-based smart contracts to communicate room reservation events for a cost-effective communication with the OTA modules and/or booking engines since APIs and communication protocols developed using the Ethereum-based smart contracts are easy to design.

In one example, the PMS module 210 is specifically designed to cooperate with the intermediate server system 250 by sharing a same application programming interface, i.e., a same remote procedure call (RTC) procedure, such that communications between the PMS module 210 and the intermediate server system 250 may take shorter processing time and become more efficient. Such efficiency becomes more obvious when the room inventory management system 200 needs to handle a huge amount of room reservation events in a short period of time, e.g., during a peak traveling season.

The PMS module 210 includes a host transceiver 212, a host processor 214 and a host memory 216. The host processor 214 is a computer processor, and the host memory 216 is a non-volatile computer-readable memory in examples of the present invention. The host transceiver 212 can handle communications with the intermediate server system 250 but doesn't directly communicate with the OTA modules OTA1, OTA2, ..., OTAM and/or booking engine BE1, BE2, ..., BEN. The host memory 216 keeps a room inventory record 218 (shown in FIG. 3) for the PMS module 210 for the hotel's room management. The room inventory record 218 includes at least availability of each room of the hotel and a count of available rooms of the hotel. The host processor 214 is capable of referencing and/or updating the room inventory record 218 in response to an occurrence of a room reservation event. For example, the host processor 214 decreases the count of available rooms and/or deactivates availability of a to-be-reserved room in response to a room reservation request. The host processor 214 may also increase the count of available rooms and/or activate availability of a reserved room in response to a room cancellation request or a room checkout request.

The intermediate server system 250 applies the blockchain technologies. Also, the intermediate server system 250 includes a transaction proxy server 260 and a plurality of node servers, for example, an amount X of node servers NS1, NS2, ..., NSX shown in FIG. 2, where X is a positive integer. The node servers NS1, NS2, ..., NSX also form a blockchain and keeps substantially same data for respective data consistency and data traceability.

The transaction proxy server 260 acts as the brain of the intermediate server system 250 and includes an intermediate transceiver 262, an intermediate processor 264 and an intermediate memory 266. In some examples, the transaction proxy server 260 acts as a trusted node that is authorized to generate blocks in the blockchain formed within the intermediate server system 250. Similarly, in examples, the intermediate processor 264 is a computer processor, and the intermediate memory 266 is a non-volatile computer-readable memory. When anyone of the OTA modules OTA1, OTA2, ..., OTAM and booking engine BE1, BE2, ..., BEN or the PMS module 210 issues a room reservation request, the intermediate transceiver 262 receives the room reservation request and forward it to the intermediate processor 264. In some examples, the intermediate transceiver 262 is implemented as an application programming interface (API) server, and the API server is used for, based on the Ethereum-based smart contracts stored in the intermediate memory 266, translating the room reservation request into a form that the PMS module 210 and the intermediate server system 250 can easily understand, i.e., replacing functions of the channel manager 150. The intermediate memory 266 keeps a room inventory record 268 (shown in FIG. 3) that are implemented using at least one of the Ethereum-based smart contracts, such that the intermediate processor 262 operates (e.g. accesses, updates, or audits) the room inventory record 268 based on instructions compatible to the plurality of Ethereum-based smart contracts. The communications between the intermediate server system 250 (or specifically the transaction proxy server 260) and the OTA modules OTA1, OTA2, ..., OTAM and/or the booking engines BE1, BE2, ..., BEN are supported by the smart contracts stored in the intermediate memory 266. The intermediate processor 264 utilizes at least one of the plurality of smart contracts to access and/or update contents of the room inventory record 268. In some examples, the intermediate transceiver 262 may also be remotely disposed from the intermediate processor 264 and/or the intermediate memory 266 for dislocating the API server's translation procedures from room inventory management procedures to avoid system overloading of the transaction proxy server 260.

In some examples, the intermediate processor 264 determines whether a room reservation event, which may be a room reservation request, a room checkout request, or a room cancellation request from the PMS module 210 or anyone of the OTA modules OTA1, OTA2, ..., OTAM or the booking engines BE1, BE2, ..., BEN, is a successful transaction. The room reservation event from anyone of the OTA modules OTA1, OTA2, ..., OTAM or the booking engines BE1, BE2, ..., BEN may be an external room reservation request or an external room cancellation request (if a reservation has been confirmed to be successful) from a client. The room reservation event from the PMS module 210 may be an internal room reservation request, an internal room cancellation request, or an internal room checkout request. Upon receiving a room reservation request, the intermediate processor 264 checks the room inventory record 268 to confirm if the room reservation request can be allowed, for example, according to availability of a requested room or if allowance of the room reservation request will cause overbooking in the hotel. If the intermediate processor 264 allows the room reservation request, the intermediate processor 264 generates a successful transaction correspondingly. Similarly, upon receiving an internal checkout request, an internal room cancellation request, or an external room cancellation request, the intermediate processor 264 checks the room inventory record 268, releases the cancelled or checked-out room, and generates a successful transaction accordingly.

For supporting complicated functions run under the blockchain technologies, the intermediate server system 250 applies at least one Ethereum-based smart contract stored in the intermediate memory 266. As mentioned before, with the aid of smart contracts' flexibility in designing and implementing functions, the intermediate server system 250 is capable of performing various types of functions in combination of traditional room reservation requirements and most updated blockchain technologies.

In some examples, after the intermediate processor 264 determines whether the room reservation event is a successful transaction, the intermediate processor 264 incorporates the successful transaction into the room inventory record 268 for updating the room inventory record 268. Also, the intermediate processor 264 may synchronize contents of the updated room inventory record 268 to each one of the node servers NS1, NS2, ..., NSX, i.e., update the blockchain formed by the node servers NS1, NS2, ..., NSX. Therefore, the node servers NS1, NS2, ..., NSX may act as backup storages for the room inventory record 268.

In some examples, as the well-known blockchain technologies demonstrates, the above block updates of the node servers NS1, NS2, ..., NSX may include the block competitions between different node servers in a same blockchain, such that some blocks are added and then abandoned in part of the node servers NS1, NS2, ..., NSX. However, the block updates of the node servers NS1, NS2, ..., NSX are assumed to cover such block competitions for brevity. Therefore, each the node server NS1, NS2, ..., NSX is assumed to have substantially same blocks that contain substantially same transaction history in the end.

As such, the contents of the room inventory record 268 can be better prevented from being sabotaged because the intermediate processor 264 can always find a precise copy of the room inventory record 268 from anyone of the node servers NS1, NS2, ..., NSX.

Each of the node servers NS1, NS2, ..., NSX has a node transceiver, a node processor and a node memory. The node processor is a computer processor. And the node memory is a non-volatile computer-readable memory. The node transceiver may receive instructions from and transmit data to the intermediate processor 264 when a successful transaction corresponding to a room reservation request occurs. The node memory may store a copy of contents of the room inventory record 268 for future updates and/or auditing. The node processor may process instructions received from the intermediate processor 264 and determine what data to respond to the intermediate processor 264. As exemplarily illustrated in FIG. 2, for example, the node server NS1 has a node transceiver NT1, a node processor NP1 and a node memory NM1; the node server NS2 has a node transceiver NT2, a node processor NP2 and a node memory NM2; and the node server NSX has a node transceiver NTX, a node processor NPX and a node memory NMX.

Figure 3:
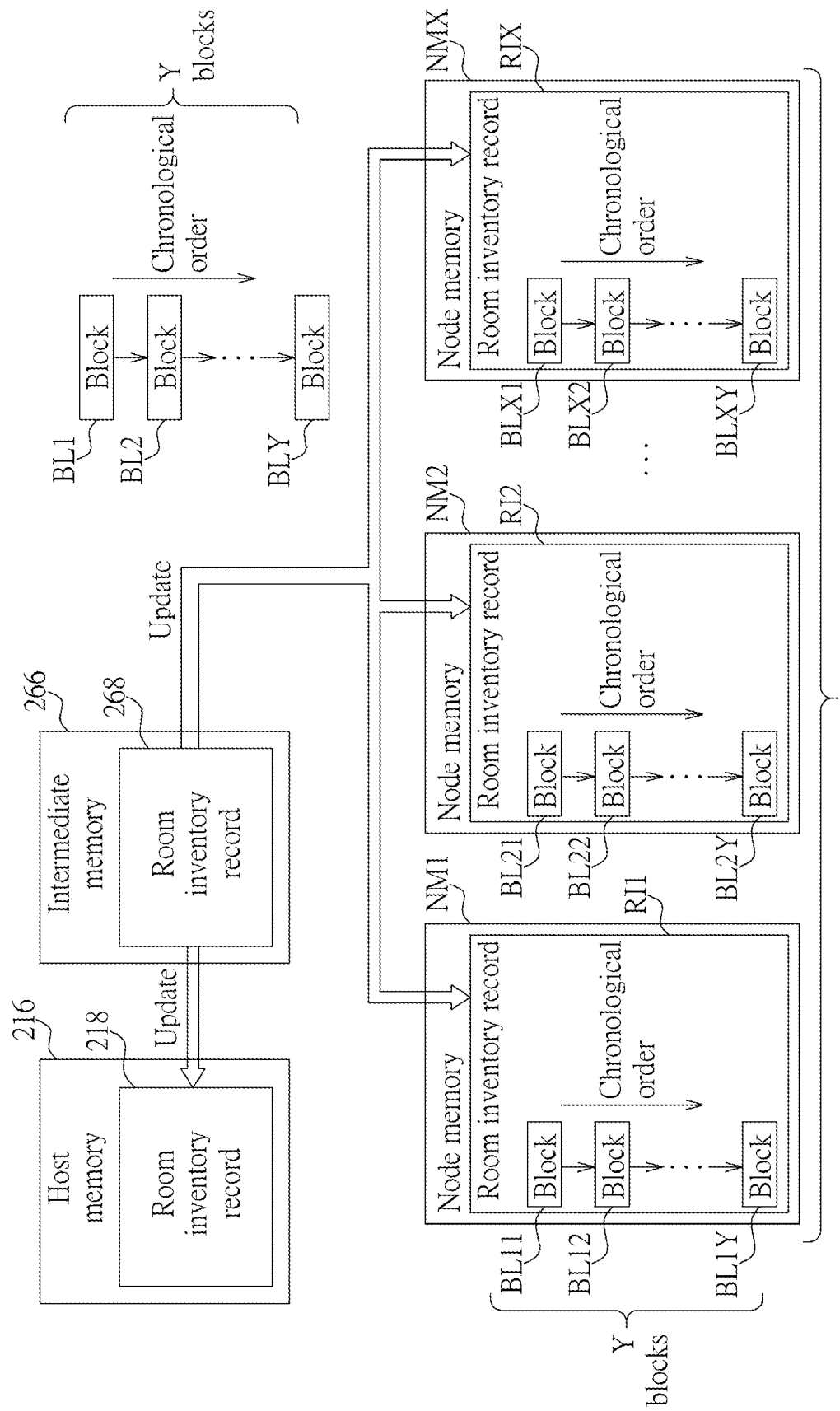
FIG. 3 illustrates a schematic diagram about data interactions between room inventory records of a host memory, an intermediate memory and node memories of the room inventory management system illustrated in FIG. 2.

FIG. 3 illustrates a schematic diagram about relations between room inventory records of the host memory 216, the intermediate memory 266 and node memories NM1, NM2, ..., NMX, i.e., the room inventory record 218, the room inventory record 268, and room inventory records RI1, RI2, ..., RIX. Each of the node memories NM1, NM2, ..., NMX stores a same plurality of smart contracts as those of the room inventory record 268. And the room inventory records RI1, RI2, ..., RIX are also implemented using the plurality of smart contracts stored in respective node memories NM1, NM2, ..., NMX. Similar as th intermediate processor 264 and the intermediate memory 266, each of the node processor NP1, NP2, ..., NPX respectively accesses and updates contents of the room inventory records RI1, RI2, ..., RIX using the plurality of smart contracts that implement the room inventory records RI1, RI2, ..., RIX.

In some examples, the intermediate processor 264 first updates the room inventory record 268 in response to occurrence of a successful transaction. Also, the intermediate processor 264 forwards the updated contents of the room inventory record 268 to the PMS module 210 via the host transceiver 212, such that the host processor 214 updates the room inventory record 218 to be synchronous with the updated contents of the room inventory record 268. The intermediate processor 264 also generates a new block that keeps at least all up-to-date successful transactions of the PMS module 212, in response to the updated contents of the room inventory record 268. In some examples, the intermediate processor 264 requires at least one smart contract stored in the intermediate memory 266 for executing complete instructions, such as calculating and updating variables, to generate the new block. For example, upon Y different successful transactions occurring in a chronological order, the intermediate processor 264 may generate a block BL1 at a moment t1, a block BL2 at a moment t2, ..., and a most recently-generated block BLY at a moment tY, where Y is a positive integer. The moment t1 is earlier than the moment t2, the moment t2 is earlier than the moment t(Y−1), and the moment t(Y−1) is earlier than the moment tY. The moment tY indicates a most-recent successful transaction that occurs at the moment tY. The block BL1 includes all up-to-date successful transactions until the moment t1. The block BL2 includes one more successful transaction occurring at the moment t2 than the block BL1, i.e., the block BL2 includes all up-to-date successful transactions until the moment t2. Similarly, the block BLY includes all up-to-date successful transactions until the moment tY.

Each of the node server NS1, NS2, ..., NSX is obligated to keep respective room inventory records RI1, RI2, ..., RIX synchronously updated with contents of the room inventory record 268 under the blockchain technologies. Therefore, after receiving the most recent generated block BLY via respective node transceivers NT1, NT2, NTX, the node processors NP1, NP2, ..., NPX respectively incorporate the most recent generated block BLY into respective room inventory records RI1, RI2, ..., RIX. In some examples, the node processors NP1, NP2, ..., NPX require at least one smart contract's assistance to synchronously execute instructions involved in the most recent transaction for completing the updates in respective room inventory records RI1, RI2, ..., RIX. The updates may include updating certain local variables or certain global variables. The certain local variables may include room availabilities or respective room prices. The certain global variables may include conditional discounts or a dynamically-adjusted room price.

Figure 4:
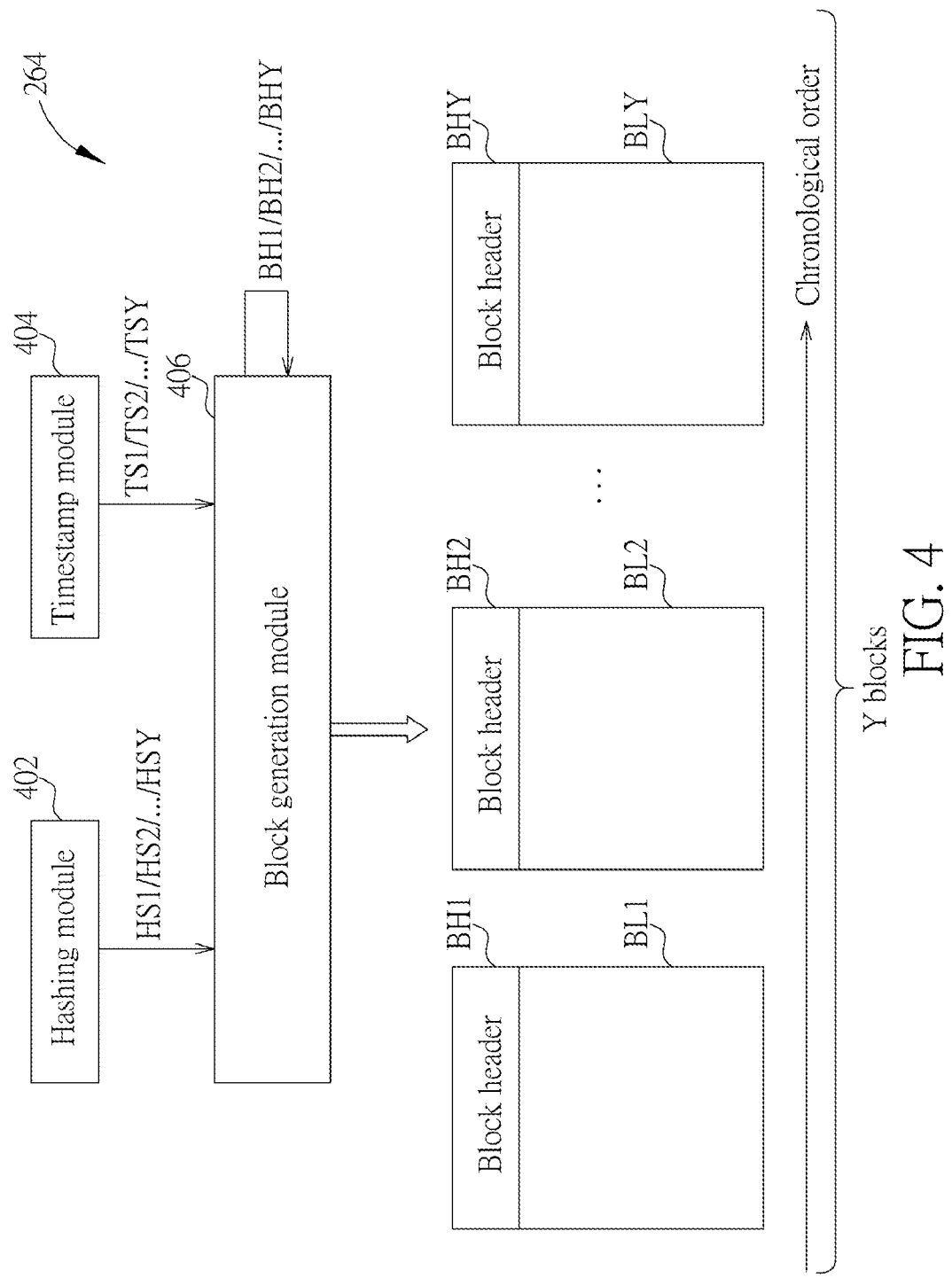
FIG. 4 illustrates how an intermediate processor of the room inventory management system illustrated in FIG. 2 generates a new block.

FIG. 4 illustrates how the intermediate processor 264 generates a new block in detail. The intermediate processor 264 includes a hashing module 402, a timestamp module 404 and a block generation module 406. As mentioned before, the intermediate processor 264 generates a new block in response to a successful transaction. Upon the intermediate processor 264 confirms the successful transaction, the hashing module 402 generates a hash value for the new block, and the timestamp module 404 generates a unique timestamp for the new block. For example, the hashing module 402 generates Y substantially unique hash values HS1, HS2, ..., HSY, and the timestamp module 404 generates Y substantially unique timestamps TS1, TS2, . . . , TSY respectively for the Y blocks BL1, BL2, . . . , BLY.

Methods of generating a hash value are well known for those who are skilled in the blockchain technologies; therefore, such methods are not specifically introduced herein. However, each generated hash value has its randomness, such that each generated hash value can substantially be unique. In some examples, the generated timestamp may be referred as the moment when the intermediate processor 264 confirms the successful transaction or when the room reservation request is initiated, for example, by the PMS module 210 or anyone of the OTA modules OTA1, OTA2, . . . , OTAM, or the booking engines BE1, BE2, . . . , BEN. In this way, each the block BL1, BL2, . . . , BLY should have its substantially unique hash value and substantially unique timestamp. And the most recently-generated block BLY has a latest timestamp among all the up-to-date generated blocks.

The block generation module 406, in response to the successful transaction, incorporate the substantially unique hash value from the hashing module 402 and the substantially unique timestamp from the timestamp module 404 for generating a block header. For example, the block generation module 406 incorporates the hash value HSY and the timestamp TSY to generate a block header BHY for the to-be-generated block BLY upon a most recent successful transaction. In this way, the block generation module 406 respectively generates block headers BH1, BH2, . . . , or BHY.

In addition, the block generation module 406, in response to the successful transaction, generates a new block that incorporates a corresponding block header, contents of the successful transaction, at least one smart contract, and contents of a directly-preceding generated block. For example, in response to a most recent successful transaction, the block generation module 406 generates the block BLY that includes the block header BHY, at least one smart contract loaded from the intermediate memory 266, and contents of a directly-preceding block BL(Y−1) (not illustrated for brevity). In this way, the most recently-generated block BLY includes contents of all previously generated blocks BL1, BL2, . . . , BL(Y−1). Also, all up-to-date successful transactions indicated by all the previously generated blocks BL1, BL2, . . . , BL(Y−1) can be easily audited by just referencing the most recently-generated block BLY.

Last, the block generation module 406 adds the new block into the blockchain formed by the node servers NS1, NS2, . . . , NSX to update the blockchain. For example, the block generation module 406 adds the most recently-generated block BLY into the blockchain that already contains blocks BL1, BL2, . . . , BL(Y−1) for updating the blockchain.

In some examples, each of the OTA modules OTA1, OTA2, . . . , OTAM and/or the booking engines BE1, BE2, . . . , BEN is allowed to, directly or via the transaction proxy server 260, access the blockchain formed by the node servers NS1, NS2, . . . , NSX. In this way, with the aid of the utilized blockchain that always keeps substantially the most recent transaction, each of the OTA modules OTA1, OTA2, . . . , OTAM and/or the booking engines BE1, BE2, . . . , BEN can always initiatively confirm the correct count of available rooms and/or availability of a specific room by referencing a most recent generated block in a timelier manner. As a result, overbooking can be substantially neutralized.

Besides, since most tasks of the PMS module 210 is relieved by the intermediate server system 250, the conventional defects of the PMS module's overloading can also be effectively and substantially avoided.

In some examples, blocks of the blockchain formed by the node servers NS1, NS2, . . . , NSX are built and audited via respective block headers, more specifically, via respective hash values. In some examples, the blockchain among the node servers NS1, NS2, . . . , NSX applies the Merkle Tree technology, such that each block of the blockchain has a substantially unique Merkle Root. If a specific block, for example the block BL1, is tampered in one of the node servers NS1, NS2, . . . , NSX, any entity which can access the blockchain can easily audit the blockchain and find the tampered block BL1 on the specific node server. The auditing procedure includes: (1) calculating a Merkle root for the block BL1 on each the node servers NS1, NS2, . . . , NSX; (2) comparing Merkle roots of all the blocks BL1 on the node servers NS1, NS2, . . . , NSX to find inconsistences on the tampered blocks BL1 on at least one node server. More specifically, since the tampered block BL1 must have a different Merkle root from those of untampered blocks BL1 on the other node servers, the different Merkle root can be easily found by the abovementioned comparison. The tampered block BL1 can also be fixed by referencing to the other untampered blocks BL1 on the other node servers. As a result, blocks on the blockchain are ensured of respective correctness, such that the room inventory records on each the node server can be secured. In some examples, an entity is authorized to access the blockchain, such as the processor of the PMS module 210, the transaction proxy server 260, or anyone of the node servers NS1, NS2, . . . , NSX for auditing or even fixing the blockchain. The above example of auditing and fixing also works for blocks other than the exemplary block BL1.

In some examples, each successful transaction can be precisely traced, which is part of the above auditing procedure, by referencing to anyone of the blocks BL1, BL2, . . . , BLY on anyone of the node servers NS1, NS2, . . . , NSX via respective block headers, more specifically, via respective timestamps. The tracing procedure can also be performed using at least one auditing smart contract stored in the intermediate memory 266 or each of the node memories NM1, NM2, . . . , NMX by an entity that is authorized to access the blockchain as mentioned above. Such entity may include the intermediate processor 264 of the transaction proxy server 260 or a node processor of anyone of the node servers NS1, NS2, . . . , NSX. Preferably, such auditing procedure is conducted by the intermediate processor 264 for immediate and non-confusing updates. The tracing procedure includes: (1) Search for block headers BH1, BH2, . . . , BHY of the blocks BL1, BL2, . . . , BLY; (2) Trace the timestamps TS1, TS2, . . . , TSY of each of the blocks BL1, BL2, . . . , BLY for distinguishing each successful transaction that initiates each of the blocks BL1, BL2, . . . , BLY. With the aid of the timestamps TS1, TS2, . . . , TSY, occurrences of each the successful transactions can be precisely confirmed in a chronological order. In this way, overbooking caused by mistakenly accepting a later successful transaction instead of an earlier successful transaction, which may not be timely informed to an OTA module or a booking engine, can be better confirmed and avoided.

In some examples, the plurality of smart contracts stored in the room inventory record 268 includes at least one dynamic pricing smart contract that are capable of determining at least one temporary and variable room price according to a temporary available room amount recorded in the room inventory record 268. The intermediate processor 264 dynamically adjusts the temporary room price and forwards the adjusted room price to the PMS module 210, the OTA modules OTA1, OTA2, . . . , OTAM, and/or the booking engines BE1, BE2, . . . , BEN via the intermediate transceiver 262. Similarly, after the host transceiver 212 receives the adjusted room price, the host processor 214 also dynamically updates the adjusted room price into the room inventory record 218.

In comparison to the conventional room inventory management system 100, the room inventory management system 200 has the following advantages: (1) Overcome the overbooking issue by making sure that all the successful transactions are recorded in a chronological order; (2) Relieve the PMS module's loading, time and bandwidth in confirming successful transactions and/or updating room inventory records with the aid of the intermediate server system 250; and (3) Enhance correctness and traceability of room inventory records.

In the abovementioned embodiment, the room inventory management system 200 applies a central module, i.e., the transaction proxy server 260, to manage primary tasks among node servers NS1, NS2, . . . , NSX of the intermediate server system 260. However, another embodiment of the present invention better balances the managing tasks by shifting such managing responsibility between the node servers NS1, NS2, . . . , NSX. Specifically, anyone of the node servers NS1, NS2, . . . , NSX may be temporarily assigned to be a master node server to manage all the node servers NS1, NS2, . . . , NSX for a period of time, and another node server among the node servers NS1, NS2, . . . , NSX may be assigned to be a new master node server for another period of time. In some examples, the transfer of a master node server's responsibility between the node servers NS1, NS2, . . . , NSX can be performed from time to time, periodically, randomly. Also, the assignment of a master node server may be performed by an election, a sequential rotation, or a predetermined rule among the node servers NS1, NS2, . . . , NSX. The predetermined rule may include dynamically assigning a node server having a smaller or the smallest burden to be the master node server, where such burden may include an instant system loading, an instant size of storage, and/or an instant transmission bandwidth. Therefore, any of the node servers NS1, NS2, . . . , NSX can be avoided from taking an unaffordable burden and from even malfunctioning.

Figure 5:
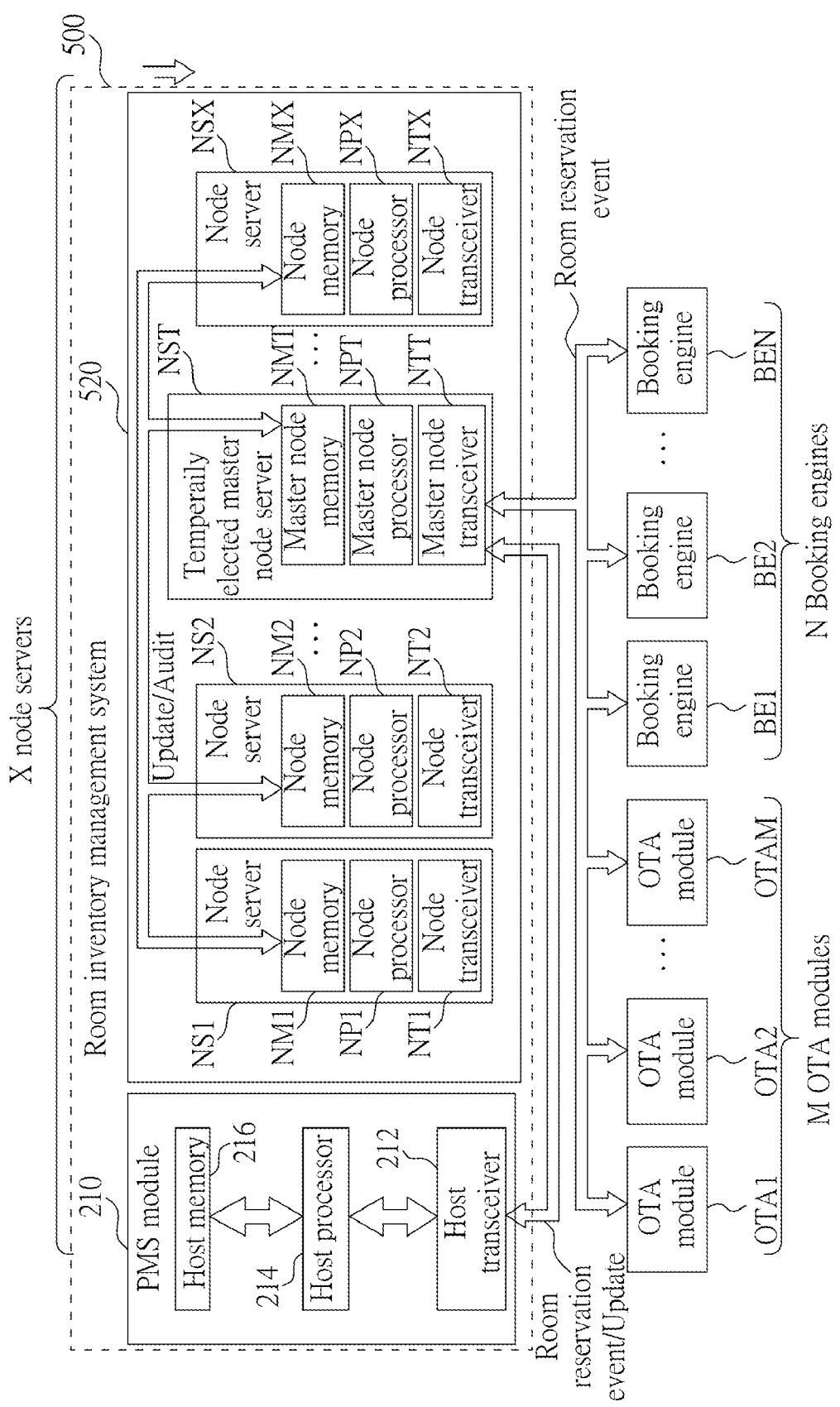
FIG. 5 illustrates a blockchain-based room inventory management system that shifts responsibility of being a master server node among node servers according to one embodiment of the present invention.

FIG. 5 illustrates a room inventory management system 500 according to another embodiment of the present invention. The room inventory management system 500 includes the PMS module 210 and an intermediate server system 520. The PMS module 210's property and disposition are the same as mentioned in FIG. 2. Such that introduction about the PMS module 210 is not repeatedly described. The intermediate server system 520 includes the plurality of node servers NS1, NS2, . . . , NSX that are the same as mentioned in FIG. 2. However, the primary difference between the room inventory managing systems 200 and 500 lies in that one of the node servers NS1, NS2, NSX can be temporarily elected to be a master node server for replacing the transaction proxy server 260, with the aid of a consensus algorithm. The master node server and its elements inherit at least the same structure and capabilities as those of the transaction proxy server 260 and its elements. Such that repeated descriptions of the master node server in view of the transaction proxy server 260 are skipped for brevity.

The consensus algorithm of electing the master node server among the node servers NS1, NS2, . . . , NSX may include a sequential order, a random order, and/or via a polling consensus involving all the node servers. An elected master node server takes the managing tasks for a predetermined period of time, and the election is held again to determine another master node server after the predetermined period of time ends, so that the previously-elected master node server can be relieved from its duty until it is elected again. The following descriptions are based on a condition that a node server NST is temporarily elected as a master node server that performs similar functions as those of the transaction proxy server 260.

Figure 6:
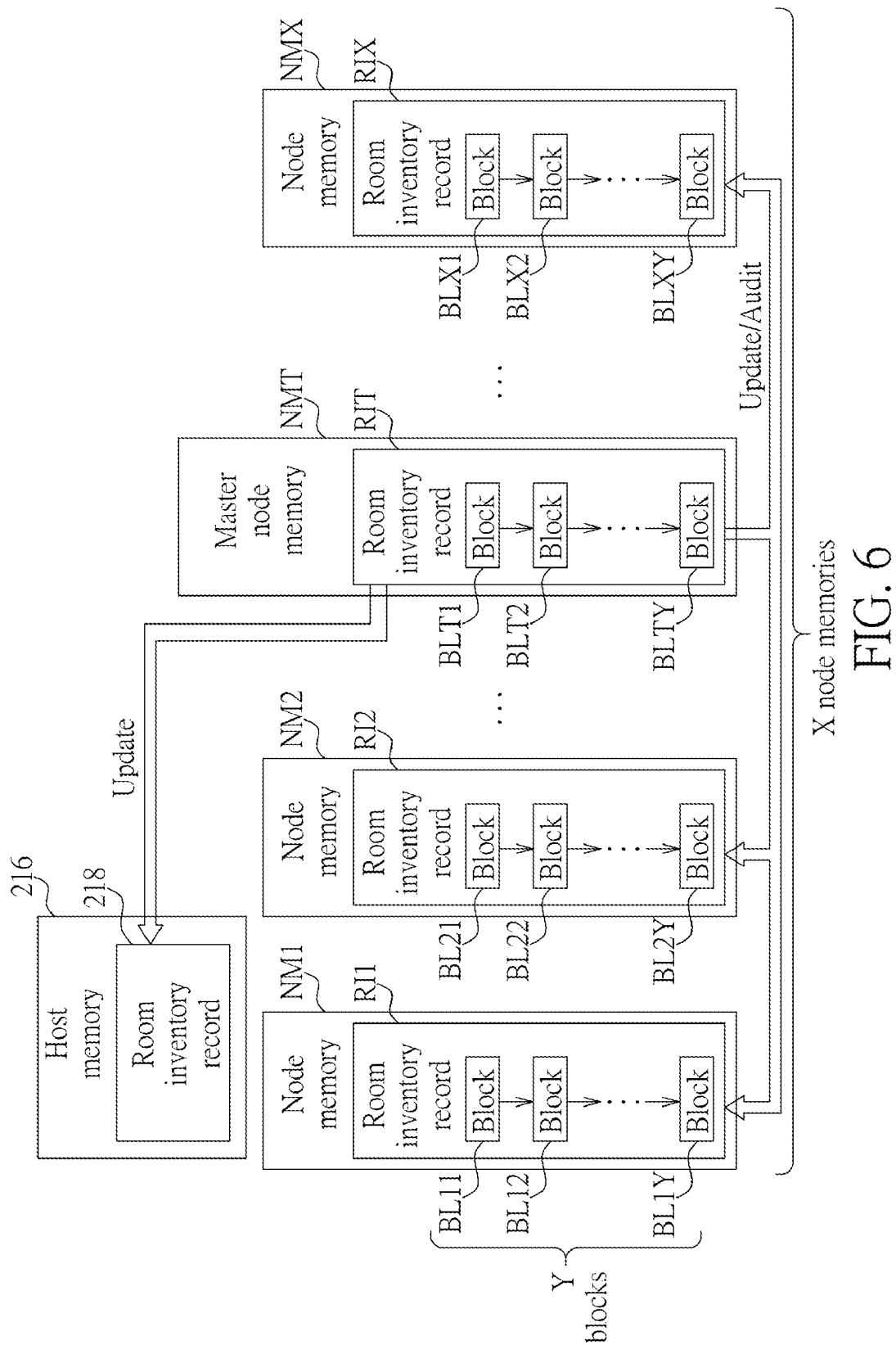
FIG. 6 illustrates a schematic diagram about data interactions between room inventory records of a host memory, a temporary master node memory and the other node memories of the room inventory management system illustrated in FIG. 5.

FIG. 6 illustrates a schematic diagram about relations between room inventory records of the host memory 216 and the other node memories NM1, NM2, . . . , NMX (including the temporary master node memory NMT), i.e., the room inventory record 218 and the room inventory records RI1, RI2, . . . , RIX (including the temporary master room inventory record RIT). Similarly, the room inventory records RI1, RI2, . . . , RIX are implemented using a plurality of smart contracts stored in the memories NM1, NM2, . . . , NMX. And the node processors NP1, NP2, . . . , NPT, . . . , NPX accesses and/or updates respective room inventory records RI1, RI2, . . . , RIX using the plurality of smart contracts. In some examples, the master node processor NST first updates the temporary master room inventory record RIT in response to occurrence of a successful transaction. Also, the master node processor NST forwards the updated contents of the temporary master room inventory record RIT to the PMS module 210 via the master node transceiver NTT and the host transceiver 212, such that the host processor 214 updates the room inventory record 218 to be substantially synchronous with the updated contents of the temporary master room inventory record RIT. The master node processor NPT also generates a new block that keeps at least all up-to-date successful transactions of the PMS module 212, in response to the updated contents of the master room inventory record RIT. It is also noted that the smart contracts stored in each of the node server NS1, NS2, . . . , NSX's memory NM1, NM2, . . . , NMT are similar as those stored in the intermediate memory 266. Therefore, in some examples, the master node processor NPT may load at least one smart contract stored in the master node memory NMT for executing complete instructions, such as calculating and updating variables, to generate the new block. For example, upon Y different successful transactions occurring in a chronological order, a preceding master node processor and/or the temporary master node processor 264 may generate a block BL1 at a moment t1, a block BL2 at a moment t2, . . . , and a most recently-generated block BLY at a moment tY, where Y is a positive integer. The moment t1 is earlier than the moment t2, the moment t2 is earlier than the moment t(Y−1), and the moment t(Y−1) is earlier than the moment tY. The moment tY indicates a most-recent successful transaction that occurs at the moment tY. The block BL1 includes all up-to-date successful transactions until the moment t1. The block BL2 includes one more successful transaction occurring at the moment t2 than the block BL1, i.e., the block BL2 includes all up-to-date successful transactions until the moment t2. Similarly, the block BLY includes all up-to-date successful transactions until the moment tY.

As mentioned previously, each of the node server NS1, NS2, . . . , NSX is required to keep respective room inventory records RI1, RI2, . . . , RIX synchronously updated with contents of a then-master room inventory record RIT under the blockchain technologies. Therefore, after receiving the most recent generated block BLY via respective node transceivers NT1, NT2, ..., NTX (except for the then-master transceiver that transmits the most recent generated block BLY), the node processors NP1, NP2, ..., NPX (except for the then-master node processor NPT) respectively incorporate the most recent generated block BLY into respective room inventory records RI1, RI2, ..., RIX (except for the then-master room inventory record RIT). In some examples, the node processors NP1, NP2, ..., NPX require at least one smart contract's assistance to synchronously execute instructions involved in the most recent transaction for completing the updates in respective room inventory records RI1, RI2, ..., RIX. The updates may include, for example, updates of certain local variables, including room availabilities or respective room prices, or updates of certain global variables, including conditional discounts or a dynamically-adjusted room price.

Figure 7:
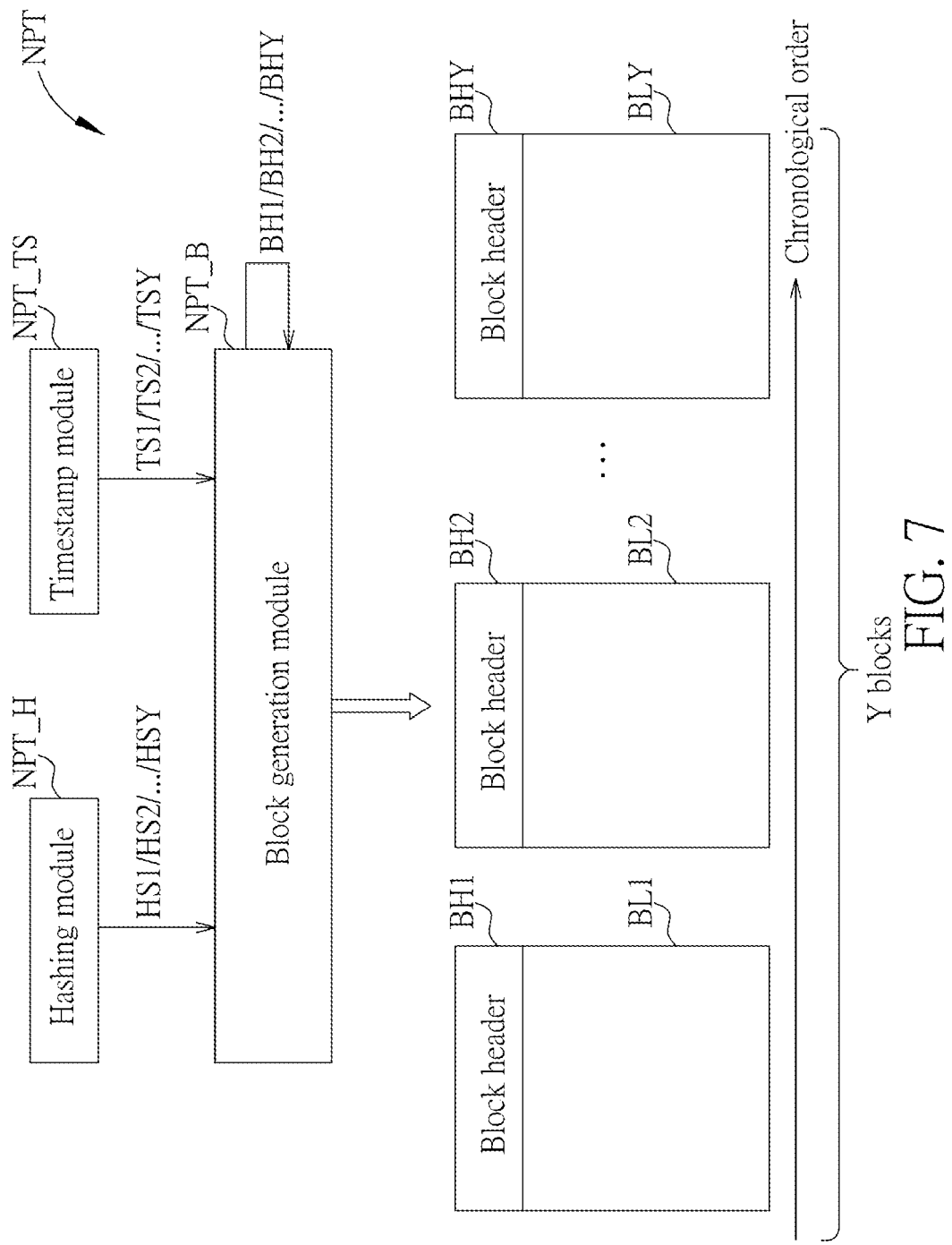
FIG. 7 illustrates how a temporary master processor of the room inventory management system illustrated in FIG. 5 generates a new block.

FIG. 7 illustrates how the temporary master node processor NPT generates a new block in detail. The temporary master node processor NPT includes a hashing module NPT_H, a timestamp module NPT_TS and a block generation module NPT_B. As mentioned before, the temporary master node processor NPT generates a new block in response to a successful transaction. Upon the temporary master node processor NPT confirms the successful transaction, the hashing module NPT_H generates a substantially unique hash value for the new block, and the timestamp module NPT_TS generates a substantially unique timestamp for the new block. For example, the hashing module NPT_H generates Y substantially unique hash values HS1, HS2, ..., HSY, and the timestamp module NPT_TS generates Y substantially unique timestamps TS1, TS2, ..., TSY respectively for the Y blocks BL1, BL2, ..., BLY.

Similar with the previous embodiment, methods of generating a hash value are well known for those who are skilled in the blockchain technologies, therefore, such methods are not specifically introduced herein. Also, in some examples, the generated timestamp may be referred as the moment when the temporary master node processor NPT confirms the successful transaction or when the room reservation event is initiated, for example, by the PMS module 210 or anyone of the OTA modules OTA1, OTA2, ..., OTAM and the booking engines BE1, BE2, ..., BEN. In this way, each the block BL1, BL2, ..., BLY should have its substantially unique hash value and substantially unique timestamp. And the most recently-generated block BLY has a latest timestamp among all the up-to-date generated blocks.

The block generation module NPT_B, in response to the successful transaction, incorporates the substantially unique hash value from the hashing module NPT_H and the substantially unique timestamp from the timestamp module NPT_TS for generating a block header. For example, the block generation module NPT_B incorporates the hash value HSY and the timestamp TSY to generate a block header BHY for the to-be-generated block BLY upon a most recent successful transaction. In this way, the block generation module NPT_B respectively generates block headers BH1, BH2, ..., or BHY.

In addition, the block generation module NPT_B, in response to the successful transaction, generates a new block that incorporates a corresponding block header, contents of the successful transaction, at least one smart contract, and contents of a directly-preceding generated block. For example, in response to a most recent successful transaction, the block generation module NPT_B generates the block BLY that includes the block header BHY, at least one smart contract loaded from the temporary master node memory NTT, and contents of a directly-preceding block BL(Y−1) (not illustrated for brevity). In this way, the most recently-generated block BLY includes contents of all previously generated blocks BL1, BL2, ..., BL(Y−1). Also, all up-to-date successful transactions indicated by all the previously generated blocks BL1, BL2, ..., BL(Y−1) can be audited by just referencing the most recently-generated block BLY.

Last, the block generation module NPT_B adds the new block into the blockchain formed by the node servers NS1, NS2, ..., NSX to update the blockchain. For example, the block generation module NPT_B adds the most recently-generated block BLY into the blockchain that already contains blocks BL1, BL2, ..., BL(Y−1) for updating the blockchain.

Similar as the room inventory management system 200, the room inventory management system 500 has substantially the same alternative embodiments, properties and advantages, as introduced in descriptions about the room inventory management system 200. Additionally, the responsibility of serving as the master server node is shifted between the node servers NS1, NS2, ..., NSX from time to time, randomly, periodically or by following a predetermined rule that balances the master node's responsibility. Therefore, the node servers NS1, NS2, ..., NSX can better balance respective loadings and avoid undesired malfunctioning.

Figure 8:
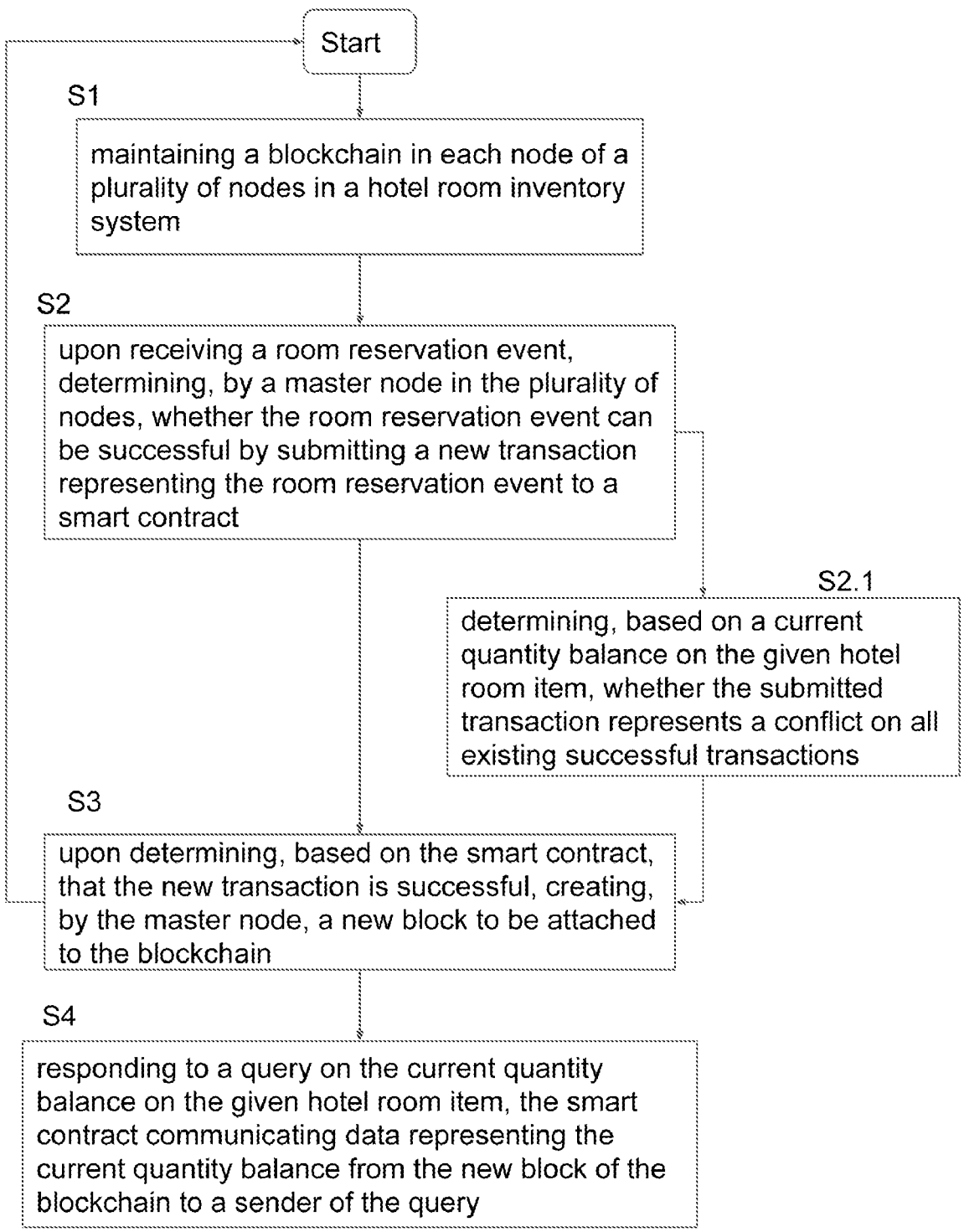
FIG. 8 illustrates a flow chart of a method for managing a blockchain-based hotel room inventory system of the present invention.

In one preferred embodiment of the present invention, as shown in the flow chart of FIG. 8, a method for managing a blockchain-based room inventory management system 200 of the present invention comprises the following steps: step S1, maintaining, in each node server of a plurality of nodes servers in a hotel room inventory management system 200, a blockchain that stores all successful transactions regarding a given hotel room item, wherein the hotel room inventory management system 200 has the plurality of node servers and each node server maintains a copy of the blockchain. The blockchain includes a number of blocks Y that are singly linked in a chronological order, each block cryptographically referencing its directly-preceding block such that data in any block cannot be changed without changing all subsequent blocks Y, each block storing a successful transaction regarding the given hotel room item.

In step S2, upon receiving a room reservation event via a computer network communicatively coupled to the hotel room inventory management system 200, determining, by a master node server in the plurality of node servers, whether the room reservation event can be successful by submitting a new transaction representing the room reservation event to a base smart contract that is stored in the blockchain. The room reservation event is received, via the computer network, from a hotel, a booking engine, an online travel agency (OTA), a global distribution system, and/or a metasearch engine. The communication with the hotel room inventory management system 200 via the computer network follows, at least in part, a remote procedure call (RPC) protocol. The transaction proxy server 260 maintains a room inventory record 268 and also checks whether the room inventory record 268 currently satisfies the room reservation event before the step S2 (the room inventory record 268 and a current room inventory are recorded based on a proceeding room reservation event and may not be exactly equal to an actual room inventory processed in the blockchain). When the room inventory record 268 satisfies the room reservation event, in the step S 2.1, the base smart contract receives the new transaction of the room reservation event and executes programmed criteria configured to determine, based on an actual quantity balance on the given hotel room item from the blockchain, whether the submitted new transaction represents a conflict on all existing successful transactions currently stored in the blockchain regarding the given hotel room item. In one preferred embodiment, base on the programmed criteria, the base smart contract determines the current quantity balance stored in the newest block of the blockchain, a hotel location of the given hotel room item, a room type of the given hotel room item, and/or a time range in the room reservation event regarding the given hotel room item, to determine whether the submitted new transaction causes any conflict or not.

The transaction proxy server 260 can be considered as an oracle. It would not be necessarily oracle when the blockchain-based room inventory management system 200 is established on a private blockchain. Nevertheless, if the blockchain-based room inventory management system 200 is established on a public blockchain, such as Ethereum, the transaction proxy server 260 may need to be an oracle based on a consensus algorithm for decentralization.

In step S3, upon determining, based on the base smart contract, that the new transaction representing the room reservation event can be successful, creating, by the master node server, a new block to be attached to the blockchain. The new block is created only when the new transaction representing the room reservation event can be determined as being successful by the base smart contract, wherein the new block stores data representing the new transaction as successful, and said creation of the new block causes the new block to be added to the blockchain in each node server of the plurality of node servers in the hotel room inventory management system 200. If the submitted transaction represents a conflict, this transaction will be considered as being failed and discarded immediately. The blocks Y of the blockchain, which may contain successful transactions having one of a room booking request, a room cancellation request, or a room checkout request, are linked in a chronological order with timestamp to register when the successful transactions are issued/receipted. All of the successful transactions are recorded in the blockchain and unchangeable.

In the step S4, the base smart contract is configured to, in response to a query received via the computer network or the transaction proxy server 260 on the current quantity balance on the given hotel room item, communicate data in the newest block (or the corresponding block in according to an algorithm such as Merkle tree) of the blockchain representing the actual quantity balance on the given hotel room item to a sender of the query. The transaction proxy server 260 push or synchronize the current quantity balance with the PMS module 210 to keep track of the room inventory record 268 being same with the room inventory record 218 of the PMS module 210, so that the OTA modules M and the booking engines N can access the current quantity balance of the room inventory.

In addition to the new transaction, the data stored in the new block are further indicative of all previous success transactions regarding the given hotel room item. The data stored in the new block includes a unique block header, date representing the new transaction, and cryptographical data representing content of the new block's directly-preceding block. The unique block header includes a unique hash value of the new block, a unique timestamp representing the time when the new transaction is issued or receipted. The given hotel room item is a select room type in a select hotel on a select date or a select period. The room reservation event can be a room reservation/booking request, a room checkout request, or a room cancellation request.

In one preferred embodiment, each hotel has its own blockchain and different hotels have different blockchains respectively. In another preferred embodiment, all different hotels can share a same blockchain. Another successful transaction from a different hotel room item may have taken place at substantially the same time as the new transaction, and all successful transactions of different hotel room items may have taken place within the hotel room inventory management system 200 at substantially the same time as the new transaction regarding the hotel room item, which is confirmed by the base smart contract and packed into the new block by the master node server.

When the base smart contract receives the room reservation event and the room reservation event is the room booking request, the programmed criteria of the base smart contract verify whether the current quantity balance on the given hotel room item, after executing the room booking request, is to become above a predetermined maximum threshold (to ensure the room inventory is sufficient). The base smart contract calculates the actual quantity balance and the master node server packs the actual quantity balance, the unique timestamp, the unique hash, and the room booking request into a new block. The new block is appended to the blockchain of the master node server and broadcasted to the other node servers. The transaction proxy server 260 automatically updates the room inventory record 268 thereof from the new block in the blockchain (via the base smart contract) to approach the current quantity balance close to the actual quantity balance when the new block is successfully appended to the blockchain, so that the users can reserve/book the hotel room. The room inventory record 268 (or the current quantity balance) may not be same with the actual quantity balance, since the next new block can be broadcasted from time to time and the transaction proxy server 260 can only acquire the information from the block newly appended to the blockchain via the base smart contract and being confirmed by most of the node servers. After the new block is added to the blockchain, the current quantity balance on the given hotel room item of the room inventory record 268 is reduced by an amount that is specified in the new transaction. If there are several new blocks BL1Y, BL2Y . . . BLXY, which have a same or overlapped room reservation event from different OTAs (or users), generated by the master node server, the one of the several new blocks BL1Y, BL2Y . . . BLXY broadcasted and accepted by most of the node servers will be the newest/latest block. Only when the newest/latest block is confirmed, the room booking request is completed and the other new blocks will be discarded. Similarly, the room cancellation request and the room checkout request are processed by the same procedure.

When the room reservation event is the room cancellation request or a room checkout request, the programmed criteria verify whether the current quantity balance on the given hotel room item, after executing the room cancellation request or the room checkout request, is to become below a predetermined minimum threshold. After the new block is added to the blockchain, the current quantity balance on the given hotel room item of the room inventory record 268 is increased by an amount that is specified in the new transaction. In one preferred embodiment, the predetermined minimum threshold is zero. Since all the successful transactions are recorded in the blockchain with the unique timestamp and the new block is appended to the blockchain only when the transaction of the new block is successful, the current quantity balance recorded on the blockchain is trustable and reliable. There is no overbooking issue occurred in the blockchain-based room inventory management system 200 of the present invention.

In one preferred embodiment, the method for managing a blockchain-based room inventory management system 200 further comprises an auditing procedure, which is based on reading the block header of each block in the blockchain to locate each block's directly-preceding block; and confirming the timestamp in each block in the blockchain to identify a successful transaction that initiates each block, so as to ensure a completeness of the blockchain by verifying that the timestamps in all the blocks Y are listed in a chronological order.

Based on a predetermined select rule, the master node server is selected from a particular group of node servers in the plurality of node servers in the hotel room inventory management system 200, and the master node server is the only node server in all node servers NS1-NSX of the room inventory management system 200 can pack all the record and content to create new blocks BL1Y, BL2Y . . . BLXY. The predetermined select rule includes selecting the master node server based on one or more of rules: a sequential order, a random order, an election, a consensus involving polling the plurality of node servers, a comparison of a system current workload, a size of available storage, and/or a transmission bandwidth of an existing master node server against a new candidate node server.

Dynamic Pricing

Figure 9:
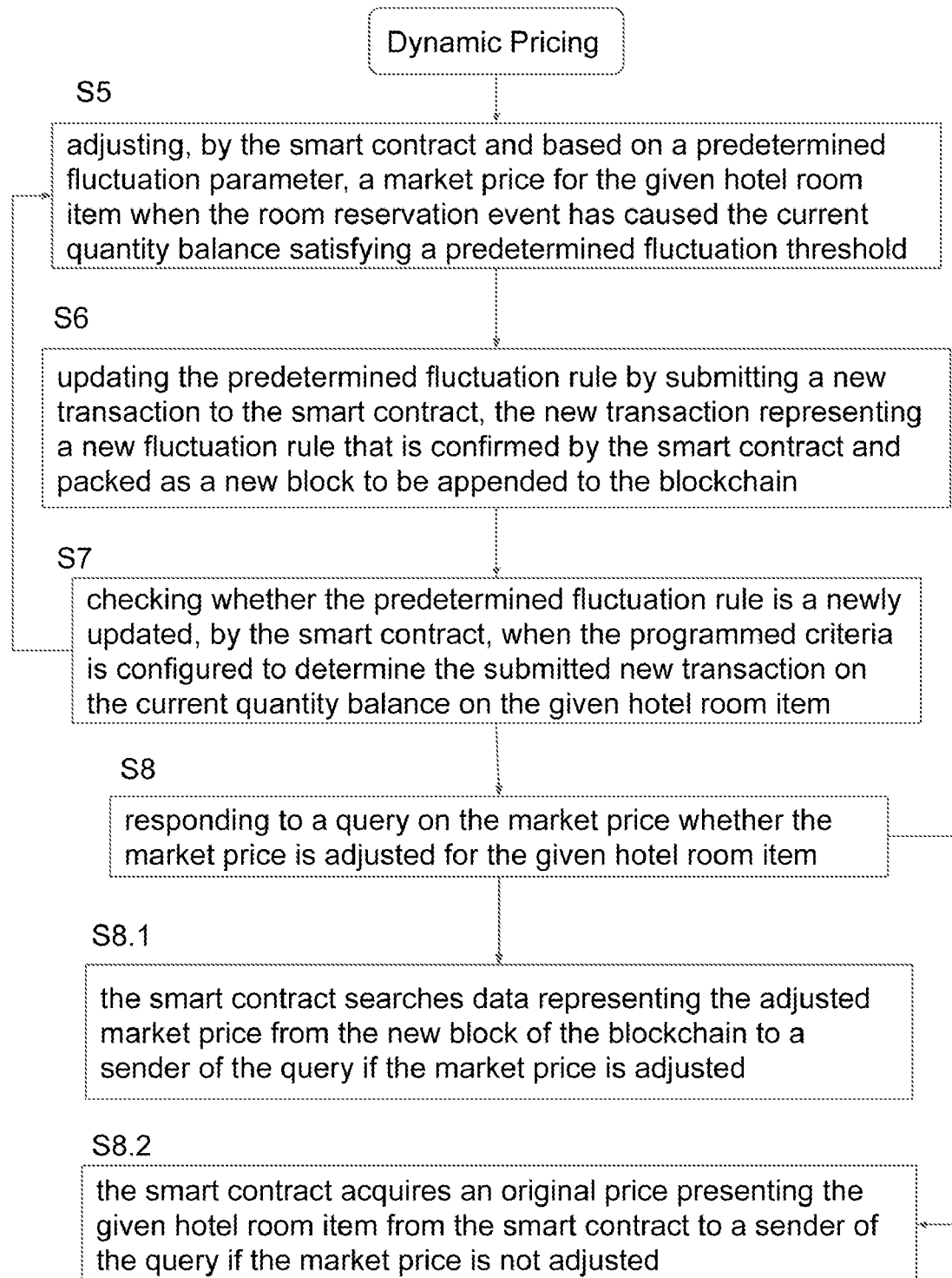
FIG. 9 illustrates a flow chart of dynamic pricing of the present invention.

As shown in step S5 of the flow chart illustrated in FIG. 9, when the block with a room reservation event is appended to the blockchain, the current quantity balance is calculated by the base smart contract according to the successful transaction and reaches a predetermined fluctuation threshold (it could be a value lower or higher than the threshold). The predetermined fluctuation threshold can be a ratio of unbooked room amount to booked room amount of the room inventory, a current date being close a predetermined date, a particular period, or a specific holiday. The base smart contract triggers a fluctuation smart contract. The fluctuation smart contract can be integrated as a part of the base smart contract or be modularized as another smart contract stored in a different block of the blockchain. An original room price written in the base smart contract is multiplied by a predetermined fluctuation parameter including a price discount parameter or a price increasing parameter, which can be pre-written in the fluctuation smart contract (e.g., when the current quantity balance of the room inventory record 268 has one-fifth of the room inventory/stock within a certain period, the fluctuation smart contract is triggered by the base smart contract and then the price of these remained rooms is multiplied by the discount parameter, such as 50% off, for stimulating sales). The transaction proxy server 260 can acquire and show the adjusted price through the base smart contract or the fluctuation smart contract from the new block of the blockchain when the transaction with the room reservation event causes a change of the current quantity balance to trigger the fluctuation smart contract. The predetermined fluctuation parameter could be written in the fluctuation smart contract or written in another block of the blockchain. The fluctuation smart contract could search/track a new predetermined fluctuation parameter written in a corresponding one block of the blockchain.

After executing certain successful transactions having room reservation events, such as the room cancellation request or room checkout request, the base smart contract calculates the actual quantity balance that has been increased to reach a value away from the predetermined fluctuation threshold while processing the new transaction, the base smart contract stops triggering the fluctuation smart contract and uses the original room price, which can be initially written in the base smart contract. The transaction proxy server 260 acquires the updated room price from the new block by the base smart contract (and the master node server) when the new block representing the new transaction of the room reservation event is appended to the blockchain.

In the step S6, the predetermined fluctuation threshold and/or the predetermined fluctuation parameter can be updated by submitting a new transaction as a new block appended to the blockchain via the base smart contract. The new transaction represents a new predetermined fluctuation threshold and/or a new predetermined fluctuation parameter to be updated. The base smart contract accepts the new transaction when the content of the new predetermined fluctuation threshold and/or the new predetermined fluctuation parameter is confirmed. The master node server packs the new transaction as a new block appended to the blockchain. When the base smart contract calculates the current quantity balance and gets the remained room amount, the base smart contract checks the new predetermined fluctuation threshold to see if the current quantity balance falls in a scope of the new predetermined fluctuation threshold. In the step S7, the base/fluctuation smart contract checks whether the predetermined fluctuation parameter/threshold is a newly updated when the programmed criteria is configured to determine the submitted new transaction based on the current quantity balance on the given hotel room item. In one preferred embodiment, the fluctuation smart contract checks whether the predetermined fluctuation parameter is new (by searching the corresponding block via the Merkle tree) when the fluctuation smart contract is triggered to ensure the room price is new and correct based on the dynamic pricing. In the step S8, the fluctuation smart contract (alternatively, via the base smart contract) can respond to a query on the market price whether the market price is adjusted for the given hotel room item. The fluctuation smart contract may search data representing the adjusted market price (with the Merkel tree algorithm) from the new block (or the corresponding block) of the blockchain to a sender of the query if the market price is adjusted (step S8.1). When the market price is not adjusted, the base smart contract may search data presenting an original price of the given hotel room item from the base smart contract itself to a sender of the query (step S8.2). The dynamic pricing of the smart contract of the present invention are recorded in the blockchain and is readable in public, it would be equitable for the customers and the travel agents. Based on the nature of the blockchain, the market price is adjusted automatically and is not manipulated by anyone secretly to truly reflect the price being based on a market mechanism.

In another preferred embodiment, a blockchain-based room inventory management system 200 of the present invention comprises a plurality of node servers, a base smart contract, and a master node server. Each node server of a plurality of node servers is configured to maintain a blockchain that stores all successful transactions regarding a given hotel room item. The blockchain includes a number of blocks Y that are singly linked in a chronological order. Each block cryptographically references its directly-preceding block such that data in any block cannot be changed without changing all subsequent blocks. Each block stores a successful transaction regarding the given hotel room item. The base smart contract that is stored in the blockchain. The base smart contract includes programmed criteria configured to determine, based on a current quantity balance on the given hotel room item, whether the submitted transaction represents a conflict on all existing successful transactions currently stored in the blockchain regarding the given hotel room item. The master node server that is configured to: receive a room reservation event from a computer network communicatively coupled to the room inventory management system 200; determine whether the room reservation event can be successful by submitting a new transaction representing the room reservation event to the base smart contract; and upon determining, based on the base smart contract, that the new transaction representing the room reservation event can be successful, create a new block to be attached to the blockchain. The new block stores data representing the new transaction as successful. The creation of the new block causes the new block to be added to the blockchain in each node server of the plurality of node servers in the room inventory management system 200. The base smart contract can trigger a fluctuation smart contract to adjust, based on the current quantity balance, a certain reservation date or a specific period of time on the given hotel room item, a market price for the given hotel room item; and communicate, via the computer network, with an agent or an administrator of the given hotel room item regarding the adjusted market price for the given hotel room item.

In another preferred embodiment, a non-transitory computer readable medium of the present invention comprises a plurality of instructions that, when executed by one or more processors of a computerized hotel room inventory management system 200, cause the system 200 to: maintain, in each node server of a plurality of node servers in the hotel room inventory management system 200, a blockchain that stores all successful transactions regarding a given hotel room item, wherein the blockchain includes a number of blocks Y that are singly linked in a chronological order, each block cryptographically referencing its directly-preceding block such that data in any block cannot be changed without changing all subsequent blocks, each block storing a successful transaction regarding the given hotel room item; upon receiving a room reservation event from a computer network communicatively coupled to the hotel room inventory management system 200, determine, by a master node server in the plurality of node servers, whether the room reservation event can be successful by submitting a new transaction representing the room reservation event to abase smart contract that is stored in the blockchain, wherein the base smart contract includes programmed criteria configured to determine, based on a current quantity balance on the given hotel room item, whether the submitted transaction represents a conflict on all existing successful transactions currently stored in the blockchain regarding the given hotel room item; and upon determining, based on the smart contract, that the new transaction representing the room reservation event can be successful, create, by the master node server, a new block to be attached to the blockchain, wherein the new block stores data representing the new transaction as successful, and wherein said creation of the new block causes the new block to be added to the blockchain in each node server of the plurality of node servers in the hotel room inventory management system 200. The base smart contract can also trigger a fluctuation smart contract to adjust a market price for the given hotel room item.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method comprising:
maintaining, in each node of a plurality of nodes in a hotel room inventory system, a blockchain that stores all successful transactions regarding a given hotel room item,
wherein the blockchain includes a number of blocks that are singly linked in a chronological order, each block cryptographically referencing its directly-preceding block such that data in any block cannot be changed without changing all subsequent blocks, each block storing a successful transaction regarding the given hotel room item;
upon receiving a room reservation event from a computer network communicatively coupled to the hotel room inventory system, determining, by a master node in the plurality of nodes, whether the room reservation event can be successful by submitting a new transaction representing the room reservation event to a base smart contract that is stored in the blockchain,
wherein the base smart contract includes programmed criteria configured to determine, based on a current quantity balance on the given hotel room item, whether the submitted transaction represents a conflict on all existing successful transactions currently stored in the blockchain regarding the given hotel room item, the current quantity balance reaches a predetermined fluctuation threshold, and the predetermined fluctuation threshold is newly updated;
upon determining, based on the base smart contract, that the new transaction representing the room reservation event can be successful, creating, by the master node, a new block to be attached to the blockchain, wherein the new block stores data representing the new transaction as successful, wherein said creation of the new block causes the new block to be added to the blockchain in each node of the plurality of nodes in the hotel room inventory system;
wherein the room reservation event causes the current quantity balance, which is calculated by the base smart contract according to the all existing successful transactions, to reach the predetermined fluctuation threshold, an original room price written in the base smart contract is multiplied by a predetermined fluctuation parameter for automatically adjusting a market price of the given hotel room item; and
updating the predetermined fluctuation parameter or the predetermined fluctuation threshold, by submitting the new transaction to the base smart contract, wherein the new transaction is confirmed by the base smart contract and is packed by the master node as the new block being appended to the blockchain for representing an updated fluctuation threshold or an updated fluctuation parameter;
wherein the base smart contract triggers the fluctuation smart contract to check whether the predetermined fluctuation parameter or the predetermined fluctuation threshold is newly updated in a corresponding one block of the blockchain by using Merkle tree search;
wherein the base smart contract is configured to, in response to a query received via the computer network on the market price whether the market price is adjusted for the given hotel room item, search data representing the adjusted market price from the new block of the blockchain to a sender of the query if the market price is adjusted, and acquire the original price presenting the given hotel room item to a sender of the query if the market price is not adjusted.

2. The method of claim 1, wherein the data stored in the new block are further indicative of, in addition to the new transaction, all previous success transactions regarding the given hotel room item.

3. The method of claim 1, wherein the new block further includes:
another successful transaction regarding a different hotel room item, the successful transaction regarding the different hotel room item having taken place at substantially a same time as the new transaction regarding the hotel room item.

4. The method of claim 1, wherein the new block further includes:
all successful transactions regarding different hotel room items having taken place within the hotel room inventory system at substantially a same time as the new transaction regarding the hotel room item.

5. The method of claim 1, wherein the room reservation event is a booking event, and wherein the programmed criteria include verifying whether the current quantity balance on the given hotel room item, after executing the booking event, is to become above a predetermined maximum threshold; and
wherein after the new block is added to the blockchain, the current quantity balance on the given hotel room item is reduced by an amount that is specified in the new transaction.

6. The method of claim 1, wherein the room reservation event is a cancellation event or a checkout event, and wherein the programmed criteria include verifying whether the current quantity balance on the given hotel room item, after executing the cancellation event or the checkout event, is to become below a predetermined minimum threshold;
wherein after the new block is added to the blockchain, the current quantity balance on the given hotel room item is increased; and
wherein the predetermined minimum threshold is zero.

7. The method of claim 1, wherein the base smart contract is configured to determine the conflict further based on:
a hotel location of the given hotel room item;
a room type of the given hotel room item; and
a time range in the room reservation event regarding the given hotel room item.

8. The method of claim 1, wherein creating the new block includes:
generating a unique hash value for the new block;
generating a unique timestamp for the new block; and
generating, based on the unique hash value and the unique timestamp, a unique block header for the new block,
wherein the unique timestamp is generated based on an issuance time or a receipt time of the room reservation event.

9. The method of claim 1, wherein the new block is created only when the new transaction representing the room reservation event can be successful.

10. The method of claim 1, wherein the new block includes:
a unique block header;
data representing the new transaction; and
cryptographically generated data representing content of the new block's directly-preceding block.

11. The method of claim 1, further comprising conducting an auditing procedure based on:
reading a block header of each block in the blockchain to locate each block's directly-preceding block; and
confirming a timestamp in each block in the blockchain to identify a successful transaction that initiates each block, so as to ensure a completeness of the blockchain by verifying that the timestamps in all of the blocks are listed in a chronological order.

12. The method of claim 1, further comprising:
selecting, based on a predetermined select rule, the master node from a particular group of nodes in the plurality of nodes in the hotel room inventory system,
wherein the master node in the hotel room inventory system is the only node that can create new blocks.

13. The method of claim 12, wherein the predetermined select rule includes selecting the master node based on one or more of: a sequential order, a random order, an election, and/or a consensus involving polling the plurality of nodes.

14. The method of claim 12, wherein the predetermined select rule includes selecting the master node based on a comparison of a system current workload, a size of available storage, and/or a transmission bandwidth of an existing master node against a new candidate node.

15. The method of claim 1, wherein the given hotel room item is a select room type in a select hotel on a select date, and wherein the room reservation event is a room booking request, a room checkout request, or a room cancellation request.

16. The method of claim 1, the method further comprising:
receiving, via the computer network, the room reservation event from a hotel, a booking engine, an online travel agency (OTA), a global distribution system, or a metasearch engine,
wherein communication with the hotel room inventory system via the computer network follows, at least in part, a remote procedure call (RPC) protocol.

17. The method of claim 1, wherein the predetermined fluctuation threshold is the current quantity balance on the given hotel room item calculated by the fluctuation smart contract, a current date being close to a specific date, or a particular period of time.

18. The method of claim 1, wherein the original room price is multiplied by the predetermined fluctuation parameter including a price discount parameter or a price increasing parameter for automatically adjusting the market price of the given hotel room item if the room reservation event causes the current quantity balance to satisfy the predetermined fluctuation threshold.

19. The method of claim 1, wherein the base smart contract is configured to, in response to the query received via the computer network on the current quantity balance on the given hotel room item, communicate data representing the current quantity balance from the new block of the blockchain to the sender of the query.

* * * * *